(12) United States Patent
Izak

(10) Patent No.: US 9,517,673 B2
(45) Date of Patent: Dec. 13, 2016

(54) VEHICLE AND A SUSPENSION SYSTEM FOR THE VEHICLE

(71) Applicant: GM GLOBAL TECHNOLOGY OPERATIONS LLC, Detroit, MI (US)

(72) Inventor: Robert G. Izak, Dryden, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 14/335,400

(22) Filed: Jul. 18, 2014

(65) Prior Publication Data

US 2016/0016451 A1    Jan. 21, 2016

(51) Int. Cl.
| | | |
|---|---|---|
| *B60G 17/00* | (2006.01) | |
| *B60G 21/00* | (2006.01) | |
| *B60G 3/20* | (2006.01) | |
| *B60G 11/56* | (2006.01) | |
| *B60G 17/04* | (2006.01) | |
| *B60G 21/073* | (2006.01) | |

(52) U.S. Cl.
CPC ............... *B60G 17/00* (2013.01); *B60G 3/20* (2013.01); *B60G 11/56* (2013.01); *B60G 17/0416* (2013.01); *B60G 21/005* (2013.01); *B60G 21/073* (2013.01); *B60G 2200/144* (2013.01); *B60G 2202/12* (2013.01); *B60G 2202/154* (2013.01); *B60G 2204/421* (2013.01)

(58) Field of Classification Search
CPC ... B60G 17/00; B60G 21/005; B60G 2204/13; B60G 2204/1302; B60G 21/026; B60G 17/033; Y10S 267/01; Y10S 280/01
See application file for complete search history.

(56) References Cited

U.S. PATENT DOCUMENTS

| | | | | |
|---|---|---|---|---|
| 1,621,916 A | * | 3/1927 | Williams et al. | 280/773 |
| 1,861,866 A | * | 6/1932 | Knox et al. | 305/133 |
| 2,169,336 A | * | 8/1939 | Best | 267/254 |
| 2,257,546 A | * | 9/1941 | Dienenthal et al. | 414/620 |
| 2,757,938 A | * | 8/1956 | Crowder | 280/124.103 |
| 2,838,191 A | * | 6/1958 | Schramm | 414/476 |
| 3,083,983 A | * | 4/1963 | Wettstein | 280/5.503 |
| 3,194,581 A | * | 7/1965 | Brueder | 280/6.157 |
| 3,203,708 A | * | 8/1965 | Chaneac et al. | 280/5.515 |
| 3,292,945 A | * | 12/1966 | Dangauthier | 280/6.159 |

(Continued)

OTHER PUBLICATIONS

Article entitled "2012 Lamborghini Aventador: Suspension Walkaround" from the website http://www.edmunds.com/car-reviews/track-tests/2012-lamborghini-aventador-suspension-walkaround.html; dated Aug. 21, 2012; 18 pages.

(Continued)

*Primary Examiner* — Paul N Dickson
*Assistant Examiner* — Timothy Wilhelm
(74) *Attorney, Agent, or Firm* — Quinn Law Group, PLLC

(57) ABSTRACT

A vehicle and a suspension system for the vehicle are disclosed. The suspension system includes a first suspension corner assembly adapted to support a structure of the vehicle and a second suspension corner assembly adapted to support the structure. The first suspension corner assembly includes a first bell crank and the second suspension corner assembly includes a second bell crank. The suspension system also includes an actuator device attached to the first and second bell cranks to selectively change at least one of a first spring rate and a preload.

20 Claims, 1 Drawing Sheet

(56) References Cited

U.S. PATENT DOCUMENTS

| | | | |
|---|---|---|---|
| 3,598,385 A * | 8/1971 | Parsons, Jr. | 267/30 |
| 3,964,563 A * | 6/1976 | Allen | 180/217 |
| 4,470,611 A * | 9/1984 | Duphily | 280/104 |
| 4,546,997 A * | 10/1985 | Smyers | 280/5.509 |
| 4,632,413 A * | 12/1986 | Fujita et al. | 280/124.103 |
| 4,650,213 A * | 3/1987 | Fujita et al. | 280/124.103 |
| 4,881,752 A * | 11/1989 | Tanaka | 280/124.128 |
| 4,921,225 A * | 5/1990 | Ludwig | 267/64.13 |
| 5,080,389 A * | 1/1992 | Kawano et al. | 280/124.142 |
| 5,108,126 A * | 4/1992 | Banse | 280/86.757 |
| 5,427,195 A * | 6/1995 | Paul et al. | 180/308 |
| 5,653,304 A * | 8/1997 | Renfroe | 180/402 |
| 6,267,387 B1 * | 7/2001 | Weiss | B60G 3/26 280/124.106 |
| 6,719,313 B2 * | 4/2004 | Zadok | 280/124.106 |
| 6,726,229 B2 * | 4/2004 | Smith et al. | 280/124.141 |
| 6,761,372 B2 * | 7/2004 | Bryant | 280/124.179 |
| 6,793,228 B2 * | 9/2004 | Zadok | 280/124.134 |
| 7,073,822 B1 * | 7/2006 | Renfroe et al. | 280/771 |
| 7,090,234 B2 * | 8/2006 | Takayanagi et al. | 280/124.103 |
| 7,389,849 B2 * | 6/2008 | Williams | 180/432 |
| 7,407,173 B2 * | 8/2008 | Walker | 280/124.134 |
| 7,628,414 B2 * | 12/2009 | Dobson et al. | 280/124.106 |
| 8,128,110 B2 * | 3/2012 | Sacli | 280/124.106 |
| 2002/0041076 A1 * | 4/2002 | Becker et al. | 280/124.179 |
| 2012/0242057 A1 | 9/2012 | Glover et al. | |

OTHER PUBLICATIONS

Article entitled "Height of Sophistication" from the website http://vehicledynamicsinternational.com; dated Jun. 2013; 3 pages.
Article entitled "Right on Track" from the website http://vehicledynamicsinternational.com; dated Jun. 2012; 3 pages.
Article entitled "Innovation of the Year" from the website http://vehicledynamicsinternational.com; dated Jun. 2013; 1 page.

* cited by examiner

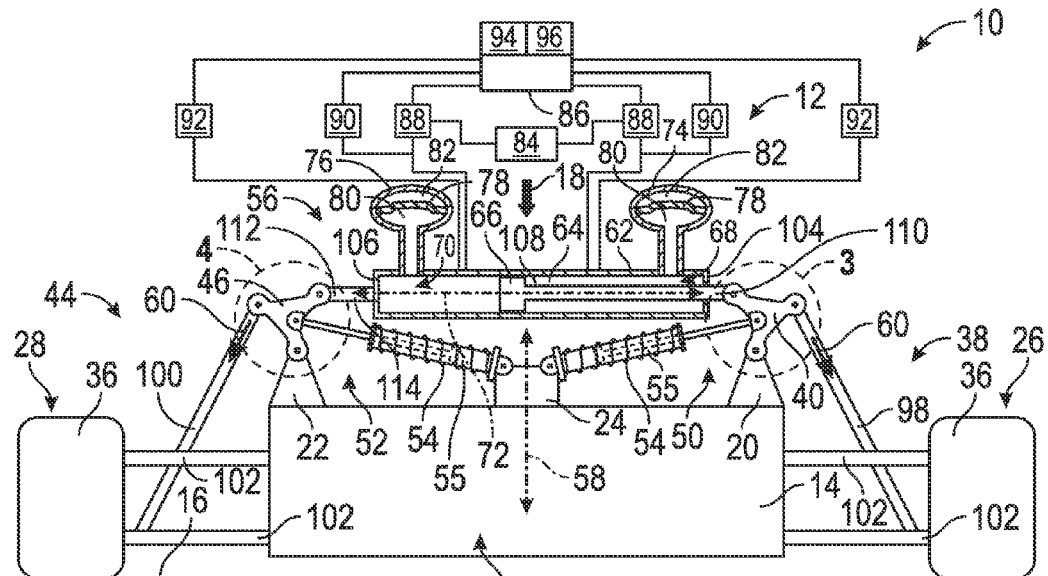
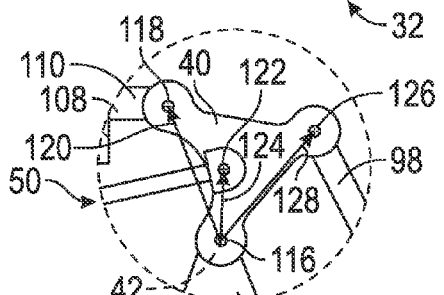
FIG. 3
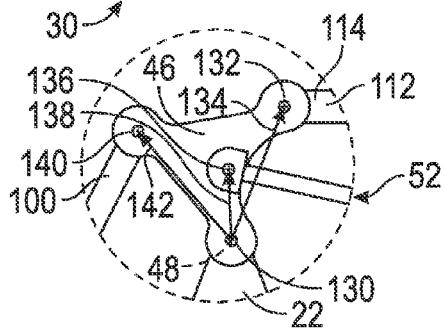
FIG. 4
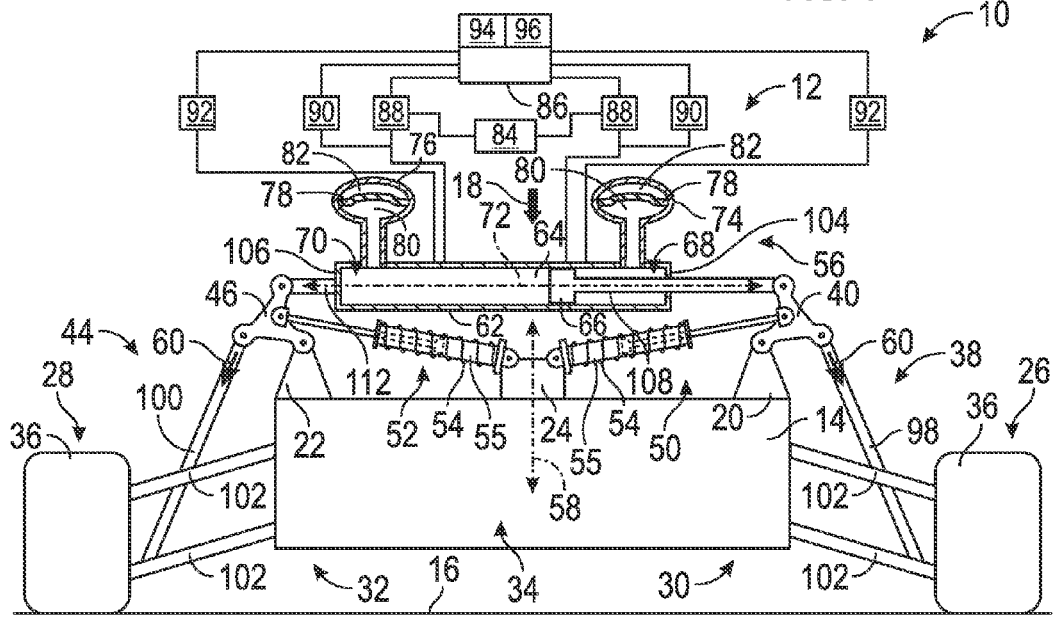
FIG. 2

VEHICLE AND A SUSPENSION SYSTEM FOR THE VEHICLE

TECHNICAL FIELD

The present disclosure relates to a vehicle and a suspension system for the vehicle.

BACKGROUND

Vehicles have been developed having a suspension system. Roads can have bumps or holes and when a vehicle travels over a bump or hole, the suspension system can dampen movement of a sprung mass of the vehicle which provides a smoother ride. During operation of a vehicle, such as a sports car, downforce applied to the vehicle at high speeds can cause movement of the suspension and this movement can affect performance of the vehicle.

SUMMARY

The present disclosure provides a vehicle including a structure and a suspension system supporting the structure. The suspension system includes a first suspension corner assembly coupled to the structure. The first suspension corner assembly includes a first bell crank rotatably attached to the structure. The suspension system further includes a second suspension corner assembly coupled to the structure. The second suspension corner assembly includes a second bell crank rotatably attached to the structure. The suspensions system also includes an actuator device attached to the first and second bell cranks The actuator device is operable to selectively change at least one of a first spring rate of the suspension system and a preload of the suspension system to counteract a downward load applied to the structure.

The present disclosure also provides a suspension system for a vehicle, with the vehicle including a structure. The suspension system includes a first suspension corner assembly adapted to support the structure and a second suspension corner assembly adapted to support the structure. The first suspension corner assembly includes a first bell crank and the second suspension corner assembly includes a second bell crank. The suspension system also includes an actuator device attached to the first and second bell cranks The actuator device is operable to selectively change at least one of a first spring rate and a preload of the suspension system.

The actuator device can be adjusted to change the first spring rate of the suspension system which changes the stiffness of the suspension system. Specifically, increasing the stiffness of the suspension system minimizes heave movement when the wheels move in the same direction. Furthermore, the actuator device can be adjusted to change the preload of the suspension system. Therefore, changing the preload of the suspension system changes the position of the structure relative to the road. Changing the preload of the suspension system changes the amount of downward load the suspension system can counteract before the structure moves closer or farther from the road.

The detailed description and the drawings or Figures are supportive and descriptive of the disclosure, but the scope of the disclosure is defined solely by the claims. While some of the best modes and other embodiments for carrying out the claims have been described in detail, various alternative designs and embodiments exist for practicing the disclosure defined in the appended claims.

BRIEF DESCRIPTION OF THE DRAWINGS

FIG. 1 is a schematic of a vehicle and a suspension system, with a piston of an actuator device in a first position.

FIG. 2 is a schematic of the vehicle and the suspension system, with the piston of the actuator device in a second position different from FIG. 1.

FIG. 3 is a schematic enlarged view of a first bell crank taken from circled area labeled 3 from FIG. 1.

FIG. 4 is a schematic enlarged view of a second bell crank taken from circled area labeled 4 from FIG. 1.

DETAILED DESCRIPTION

Those having ordinary skill in the art will recognize that terms such as "above", "below", "upward", "up", "downward", "down", "top", "bottom", "left", "right", etc., are used descriptively for the figures, and do not represent limitations on the scope of the disclosure, as defined by the appended claims. Furthermore, the term "substantially" can refer to a slight imprecision or slight variance of a condition, quantity, value, or dimension, etc.

Referring to the Figures, wherein like numerals indicate like or corresponding parts throughout the several views, a vehicle 10 and a suspension system 12 for the vehicle 10 are generally shown in FIGS. 1 and 2. The vehicle 10 can be an automotive vehicle, such as, a car, a sports car, a truck, etc. Furthermore, the vehicle 10 can be a hybrid vehicle utilizing an internal combustion engine and one or more motor-generators. Additionally, the vehicle 10 can be an electric vehicle utilizing one or more motor-generators and eliminating the internal combustion engine. As another example, the vehicle 10 can be a vehicle utilizing the internal combustion engine and eliminating the motor-generator(s). It is to be appreciated that the vehicle 10 can alternatively be a non-automotive vehicle.

Referring to FIGS. 1 and 2, the vehicle 10 includes a structure 14. The suspension system 12 supports the structure 14 and the structure 14 is spaced from a road 16 or the ground. The structure 14 can be one or more of: a chassis, a support structure, a frame, a subframe, a body, a brace, a panel, an outer skin, etc. The structure 14 can be any suitable configuration. Additionally, the structure 14 can be any component of a sprung mass of the vehicle 10, including the body, the frame, the subframe, the chassis, the outer skin, or any load-bearing component which is supported by the suspension system 12.

The suspension system 12 can dampen movement of the structure 14 as the vehicle 10 travels over the road 16 to provide a smoother ride. Additionally, the suspension system 12 can offset a downward load 18 (see arrow 18 in FIGS. 1 and 2) applied to the structure 14/vehicle 10. Specifically, the suspension system 12 can be adjusted to change the stiffness of the ride of the vehicle 10 by adjusting a first spring rate of the suspension system 12. Furthermore, the first spring rate of the suspension system 12 can offset pitch (forward/back) movement of the vehicle 10 during braking or acceleration. In addition, the suspension system 12 can reposition the structure 14 toward or away from the road 16 by adjusting a preload of the suspension system 12. Details of the suspension system 12 are discussed further below.

The downward load 18 applied to the structure 14/vehicle 10 can include a load created by the weight of cargo or passenger(s) in the vehicle. Additionally or alternatively, the downward load 18 applied to the structure 14/vehicle 10 can include aerodynamic loads. The downward load can be a downforce applied to the structure 14. For example, optionally, the vehicle 10 can include one or more aerodynamic members or elements that can be manipulated to change the downward load 18 applied to the structure 14 or sprung mass of the vehicle 10. The aerodynamic member(s) can be any suitable configuration, and a couple non-limiting examples are a spoiler and a tail fin. As the vehicle 10 moves, the aerodynamics of the vehicle 10 create the downward load 18 that is applied to the vehicle 10, and more specifically, applied to the structure 14. Therefore, when utilizing the aerodynamic member(s), the downward load 18 applied to the vehicle 10/structure 14 changes. For example, by increasing the downward load 18 applied to the structure 14, the cornering of the vehicle 10 can be improved as compared to when a lower downward load 18 is applied to the vehicle 10. It is to be appreciated that when utilizing the aerodynamic member(s), the aerodynamic member(s) can be in any suitable location.

Continuing with FIGS. 1 and 2, in certain embodiments, the structure 14 can include a first support 20 and a second support 22 spaced from each other. Furthermore, in certain embodiments, the structure 14 can include a third support 24 disposed between the first and second supports 20, 22. The first, second and third supports 20, 22, 24 provide stationary points or fixed points for other components of the vehicle 10 to be attached thereto, some of which are discussed below.

As shown in FIGS. 1 and 2, the vehicle 10 can also include a first wheel assembly 26 and a second wheel assembly 28. The wheel assemblies 26, 28 rotate over the road 16 and are coupled to the suspension system 12. The wheel assemblies 26, 28 can be disposed on opposite sides of the vehicle 10, such as left and right sides of the vehicle 10. For example, the first wheel assembly 26 can be disposed along a driver's side 30 of the vehicle 10 and the second wheel assembly 28 can be disposed along a passenger's side 32 of the vehicle 10. Furthermore, the first and second wheel assemblies 26, 28 can be for a front 34 of the vehicle 10 or any other suitable location of the vehicle 10. When the first and second wheel assemblies 26, 28 are for the front 34 of the vehicle 10, the wheel assemblies 26, 28 can be referred to as front wheel assemblies.

The first and second wheel assemblies 26, 28 each include a tire 36 (see FIGS. 1 and 2) and a hub supporting respective tires 36. The downward load 18 is applied to the vehicle 10/structure 14 which is transmitted to the tires 36 and creates grip between the tires 36 and the road 16. For example, when increasing the downward load 18 applied to the vehicle 10, the downward load applied to the tires 36 can increase which creates more grip between the tires 36 and the road 16.

As generally shown in FIGS. 1 and 2, the vehicle 10 includes a first suspension corner assembly 38 coupled to the structure 14. More specifically, the suspension system 12 includes the first suspension corner assembly 38 adapted to support the structure 14. Additionally, the first wheel assembly 26 can be coupled to the first suspension corner assembly 38.

As best shown in FIG. 3, the first suspension corner assembly 38 includes a first bell crank 40 selectively rotatable about a first axis 42. Specifically, as shown in FIGS. 1 and 2, the first bell crank 40 is rotatably attached to the structure 14. In certain embodiments, the first bell crank 40 is rotatably attached to the first support 20. Said differently, the first bell crank 40 is rotatably positioned about the first axis 42. The first bell crank 40 is selectively rotatable as discussed further below.

As generally shown in FIGS. 1 and 2, the vehicle 10 includes a second suspension corner assembly 44 coupled to the structure 14. More specifically, the suspension system 12 includes the second suspension corner assembly 44 adapted to support the structure 14. Additionally, the second wheel assembly 28 can be coupled to the second suspension corner assembly 44.

Generally, the first and second suspension corner assemblies 38, 44 are spaced from each other. For example, the first and second suspension corner assemblies 38, 44 can be spaced across the vehicle 10. As such, the first suspension corner assembly 38 can be disposed along the driver's side 30 of the vehicle 10 and the second suspension corner assembly 44 can be disposed along the passenger's side 32 of the vehicle 10. Furthermore, the first and second suspension corner assemblies 38, 44 can be utilized for the front 34 of the vehicle 10 or any other suitable location. When the first and second suspension corner assemblies 38, 44 are for the front 34 of the vehicle 10, the suspension corner assemblies 38, 44 can be referred to as the front suspension assemblies.

As best shown in FIG. 4, the second suspension corner assembly 44 includes a second bell crank 46 selectively rotatable about a second axis 48. Specifically, as shown in FIGS. 1 and 2, the second bell crank 46 is rotatably attached to the structure 14. In certain embodiments, the second bell crank 46 is rotatably attached to the second support 22. Said differently, the second bell crank 46 is rotatably positioned about the second axis 48. The second bell crank 46 is selectively rotatable as discussed further below.

Continuing with FIGS. 1, and 2, the first suspension corner assembly 38 can include a first coil-over shock 50 attached to the first bell crank 40 and the third support 24. Additionally, the second suspension corner assembly 44 can include a second coil-over shock 52 attached to the second bell crank 46 and the third support 24. Therefore, both of the first and second coil-over shocks 50, 52 are secured to the third support 24, and in certain embodiments, secured to the third support 24 in different locations (see FIGS. 1 and 2). Generally, the first and second coil-over shocks 50, 52 can each be utilized to dampen movement of the structure 14 or sprung mass of the vehicle 10 as the vehicle 10 travels over the road 16. Specifically, the first and second coil-over shocks 50, 52 cooperate to dampen movement of the structure 14 as the vehicle 10 travels over the road 16. For example, the first and second coil-over shocks 50, 52 can dampen movement of the structure 14 as the vehicle 10 moves over bumps, holes, etc.

The first and second coil-over shocks 50, 52 can each include a coil spring 54 and a piston/rod/cylinder device 55. The coil spring 54 of the first coil-over shock 50 at least partially surrounds the piston/rod/cylinder device 55 of the first coil-over shock 50. Similarly, the coil spring 54 of the second coil-over shock 52 at least partially surrounds the piston/rod/cylinder device 55 of the second coil-over shock 52. It is to be appreciated that the first and second coil-over shocks 50, 52 can include other components and configurations than discussed above.

As generally shown in FIGS. 1 and 2, the vehicle 10, and more specifically, the suspension system 12 also includes an actuator device 56 attached to the first and second bell cranks 40, 46. Generally, the actuator device 56 is coupled to the first and second suspension corner assemblies 38, 44. Therefore, for example, the actuator device 56 can extend across the vehicle 10 between the first and second suspension corner assemblies 38, 44. Simply stated, the actuator device 56 is disposed between left and right sides of the vehicle 10. Thus, the actuator device 56 can change the first spring rate and/or the preload of the first and second suspension corner assemblies 38, 44 of the suspension system 12.

The actuator device 56 is operable to selectively change at least one of the first spring rate and the preload of the suspension system 12. Specifically, the actuator device 56 is operable to selectively change at least one of the first spring rate of the suspension system 12 and the preload of the suspension system 12 to counteract the downward load 18 applied to the structure 14. Simply stated, the actuator device 56 sets the first spring rate and the preload of the suspension system 12 in response to the downward load 18. As mentioned above, changing the first spring rate changes the stiffness of the suspension system 12 and changing the preload changes the amount of downward load 18 the suspension system 12 counteracts. Changing the preload can also reposition the structure 14 toward or away from the road 16.

The phrase "at least one of" as used herein should be construed to include the non-exclusive logical "or", i.e., at least one of the first spring rate or the preload. Therefore, in certain embodiments, the actuator device 56 can selectively change the first spring rate or the preload. In other embodiments, the actuator device 56 can selectively change both of the first spring rate and the preload.

The actuator device 56 is operable in a parallel relationship to the first and second coil-over shocks 50, 52. The first and second coil-over shocks 50, 52 have a second spring rate, which can be substantially proportional, i.e., substantially the same, or different from the first spring rate. The first spring rate of the actuator device 56 can be changed and acts in a parallel relationship to the second spring rate of each of the first and second coil-over shocks 50, 52. As such, the actuator device 56 is operable in a parallel relationship to the first and second coil-over shocks 50, 52 such that the second spring rate remains substantially the same when the first spring rate changes. Said differently, the second spring rate remains substantially the same when the first spring rate of the actuator device 56 is changed.

Generally, the actuator device 56 can be utilized to selectively change the first spring rate of the suspension system 12 to selectively change the stiffness of the suspension system 12 and/or to offset pitch (forward/back) movement of the structure 14 during braking or acceleration. Furthermore, the actuator device 56 can be utilized to reposition the structure 14 toward or away from the road 16 by selectively changing the preload of the suspension system 12. For example, when the structure 14 is repositioned toward the road 16, the aerodynamics of the vehicle can be enhanced.

Specifically, the actuator device 56 can be operable to selectively change the first spring rate without rotating the first and second bell cranks 40, 46. Furthermore, the actuator device 56 can be operable to selectively rotate the first and second bell cranks 40, 46 concurrently about the first and second axes 42, 48 respectively to change the preload which selectively reposition the structure 14 along a vertical axis 58. The vertical axis 58 is transverse to the road 16. Specifically, the actuator device 56 is operable to selectively rotate the first and second bell cranks 40, 46 concurrently about the first and second axes 42, 48 respectively which selectively changes an amount of force 60 applied to the first and second suspension corner assemblies 38, 44. Changing the amount of force 60 applied to the first and second suspension corner assemblies 38, 44 changes the preload of the suspension system 12 which can change the position of the structure 14 along the vertical axis 58.

For example, the actuator device 56 can be utilized to maintain the height of the structure 14 relative to the road 16 when the downward load 18 changes. As another example, the actuator device 56 can be utilized to offset pitch (forward/back) motion of the vehicle 10 during braking or acceleration of the vehicle 10. As yet another example, the actuator device 56 can be utilized to change the preload that the suspension system 12 can counteract against the downward load 18. As another example, the actuator device 56 can be utilized to vary the height of the structure 14 relative to the road 16. In other words, the actuator device 56 can adjust heave (up/down) motion of the vehicle 10, and more specifically heave (up/down) of the structure 14. Generally, increasing the amount of force 60 applied to the first and second suspension corner assemblies 38, 44, moves the structure 14 away from the road 16 along the vertical axis 58. Therefore, decreasing the amount of force 60 applied to the first and second suspension corner assemblies 38, 44, moves the structure 14 toward the road 16 along the vertical axis 58. For example, moving the structure 14 away from the road 16 along the vertical axis 58 provides more clearance between the sprung mass and the road 16. As another example, moving the structure 14 toward the road 16 along the vertical axis 58 can improve the aerodynamics of the vehicle 10 and/or improve handling of the vehicle 10. Moving the structure 14 toward or away from the road 16 can change the downward load 18 applied to the vehicle 10.

Continuing with FIGS. 1 and 2, the actuator device 56 can include a cylinder 62 defining a chamber 64. Furthermore, the actuator device 56 can include a piston 66 disposed inside the chamber 64 to split the chamber 64 into a first chamber portion 68 and a second chamber portion 70. The piston 66 can be movable inside the chamber 64 in response to rotation of the first and second bell cranks 40, 46 about the first and second axes 42, 48 respectively. The piston 66 is selectively movable inside the chamber 64 along a longitudinal axis 72 to correspondingly change sizes of the first and second chamber portions 68, 70 which selectively change the preload. Comparing FIGS. 1 and 2, movement of the piston 66 causes the first and second bell cranks 40, 46 to rotate about the respective first and second axes 42, 48, and rotation of the first and second bell cranks 40, 46 cause the amount of force 60 applied to the first and second suspension corner assemblies 38, 44 to reposition the structure 14.

Generally, a fluid is disposed in the chamber 64 and when additional fluid is injected or removed from the first and second chamber portions 68, 70, the piston 66 moves accordingly. For example, when additional fluid is injected into the first chamber portion 68 and fluid is removed from the second chamber portion 70, the piston 66 moves inside the cylinder 62 which causes the first chamber portion 68 to increase in size and the second chamber portion 70 to decrease in size. As another example, when the fluid is injected into the second chamber portion 70 and fluid is removed from the first change portion, the piston 66 again moves inside the cylinder 62 which causes the second chamber portion 70 to increase in size and the first chamber portion 68 to decrease in size. Moving the piston 66 of the actuator device 56, rotates the first and second bell cranks 40, 46 which changes the preload, and thus, the amount of force 60 applied to the first and second suspension corner assemblies 38, 44 to counteract the downward load 18. The fluid can be a liquid fluid or a gaseous fluid. Examples of suitable liquid fluids are oil, hydraulic fluid, etc. The actuator device 56 utilizes a small amount of fluid to change the stiffness of the suspension system 12 and/or the height of the structure 14.

Referring to FIGS. 1 and 2, the actuator device 56 can further include a first accumulator 74 in fluid communication with the first chamber portion 68 and a second accumulator 76 in fluid communication with the second chamber portion 70. Therefore, the first and second accumulators 74, 76 are attached to the cylinder 62. Each of the first and second accumulators 74, 76 can have a bladder 78 or diaphragm separating a liquid fluid side 80 and a gaseous fluid side 82. The liquid fluid side 80 is in fluid communication with the chamber 64. Specifically, the liquid fluid side 80 of the first accumulator 74 is in fluid communication with the first chamber portion 68 and the liquid fluid side 80 of the second accumulator 76 is in fluid communication with the second chamber portion 70. Therefore, the chamber 64 and the liquid fluid side 80 of the first and second accumulators 74, 76 have liquid fluid therein at all times. The gaseous fluid side 82 of the first and second accumulators 74, 76 can have a gaseous fluid stored therein, and the gaseous fluid can be nitrogen or any other suitable gaseous fluid. When utilizing the cylinder 62 and the accumulators 74, 76 as discussed herein, the actuator device 56 can be referred to as a hydro-pneumatic actuator.

The first and second accumulators 74, 76 cooperate to selectively change the first spring rate of the actuator device 56. Specifically, pressure is selectively changed in the first and second accumulators 74, 76 while the piston 66 remains substantially stationary inside the chamber 64 to selectively change the first spring rate. Increasing the pressure in the first and second accumulators 74, 76 can increase the stiffness of the suspension system 12. Increasing pressure in one of the first and second chamber portions 68, 70 and decreasing pressure in the other one of the first and second chamber portions 68, 70 can increase the preload of the suspension system 12. The actuator device 56 can change the stiffness of the suspension system 12, in conjunction with or without, changing the height of the structure 14 relative to the road 16. Examples of the actuator device 56 functioning in different situations are below.

When the actuator device 56 is being utilized to increase stiffness of the suspension system 12 which can improve handling of the vehicle 10, the first spring rate of the suspension system 12 can be increased. Therefore, the suspension system 12 can offset larger downward loads 18. To increase the stiffness of the suspension system 12, while substantially maintaining the height of the vehicle 10 in its current position, additional liquid fluid can be fed into both the first and second chamber portions 68, 70 such that the piston 66 remains in substantially the same position. Since the position of the piston 66 remains substantially the same, the size of the first and second chamber portions 68, 70 remains substantially the same, and therefore, the additional liquid fluid entering the first and second chamber portions 68, 70 cause some of the liquid fluid that is in the first and second chamber portions 68, 70 to enter the liquid fluid side 80 of respective first and second accumulators 74, 76. As the liquid fluid increases the size of the liquid fluid side 80 of the accumulators 74, 76, the gaseous fluid side 82 of each of the first and second accumulators 74, 76 decreases in size and compresses the gaseous fluid therein which increases the first spring rate.

When the actuator device 56 is being utilized to lower the structure 14 along the vertical axis 58 toward the road 16 which can increase the downward load 18 applied to the vehicle 10, the preload of the suspension system 12 can be decreased. The position of the piston 66 in the chamber 64 can be adjusted which correspondingly causes the first and second bell cranks 40, 46 to rotate. Rotation of the first and second bell cranks 40, 46 causes the amount of force 60 applied to the first and second suspension corner assemblies 38, 44 to change the preload of the suspension system 12 to reposition the structure 14 relative to the road 16. To move the structure 14 toward the road 16 along the vertical axis 58, additional liquid fluid is injected into the first chamber portion 68 while some liquid fluid is expelled out of the second chamber portion 70 which causes the piston 66 to move toward one end of the chamber 64, and thus the first and second bell cranks 40, 46 correspondingly rotate. Generally, the amount of force 60 applied to the first and second suspension corner assemblies 38, 44 decrease to lower the structure 14 toward the road 16. Thus, the preload of the suspension system 12 is decreased.

When the actuator device 56 is being utilized to decrease stiffness of the suspension system 12 which can improve the ride of the vehicle 10, the first spring rate can be decreased. To decrease the stiffness of the suspension system 12, while substantially maintaining the height of the vehicle 10 in its current position, liquid fluid can be expelled from both the first and second chamber portions 68, 70 such that the piston 66 remains substantially in the same position. Since the position of the piston 66 remains substantially the same, the size of the first and second chamber portions 68, 70 remains substantially the same, and therefore, the liquid fluid being removed from the first and second chamber portions 68, 70 allows some of the liquid fluid that is in the liquid fluid side 80 of respective first and second accumulators 74, 76 to be expelled into the first and second chamber portions 68, 70 by the gaseous fluid expanding the gaseous fluid side 82 of each of the first and second accumulators 74, 76. As the gaseous fluid expands, the gaseous fluid side 82 of each of the first and second accumulators 74, 76 increase in size. Thus, the first spring rate of the suspension system 12 is decreased.

When the actuator device 56 is being utilized to raise the structure 14 along the vertical axis 58 away from the road 16 which can increase clearance between the structure 14 and the road 16 (compare FIGS. 1 and 2), the preload of the suspension system 12 can be increased. The position of the piston 66 in the chamber 64 can be adjusted which correspondingly causes the first and second bell cranks 40, 46 to rotate. Rotation of the first and second bell cranks 40, 46 causes the amount of force 60 applied to the first and second suspension corner assemblies 38, 44 to change to reposition the structure 14 relative to the road 16. To move the structure 14 away from the road 16 along the vertical axis 58, additional liquid fluid is injected into the second chamber portion 70 while some liquid fluid is expelled out of the first chamber portion 68 which causes the piston 66 to move toward another end the chamber 64, and thus the first and second bell cranks 40, 46 correspondingly rotate. Generally, the amount of force 60 applied to the first and second suspension corner assemblies 38, 44 increases to raise the structure 14 away from the road 16. Thus, the preload of the suspension system 12 is increased.

Again, continuing with FIGS. 1 and 2, the vehicle 10 can also include a pump 84 to deliver or feed the liquid fluid to the chamber 64 and a controller 86 in electrical communication with the pump 84 to control delivery of the liquid fluid to the chamber 64. In certain embodiments, the pump 84 can be an oil or hydraulic pump. Additionally, the vehicle 10 can include one or more valves 88 in electrical communication with the controller 86. Furthermore, the valves 88 can also be in fluid communication with the chamber 64 and the pump 84. For example, one of the valves 88 can be in fluid communication with the pump 84 and the first chamber portion 68 while another one of the valves 88 can be in fluid communication with the pump 84 and the second chamber portion 70. The valves 88 can selectively open and close to selectively allow liquid fluid to move therethrough. Therefore, the pump 84 and the valves 88 cooperate to provide the desired amount of liquid fluid inside the chamber 64 and the first and second accumulators 74, 76. The controller 86 electrically communicates with the pump 84 and the valves 88 to control movement of the liquid fluid in and out of the chamber 64/the first and second accumulators 74, 76. Therefore, the actuator device 56 can be hydraulically controlled.

In addition, as shown in FIGS. 1 and 2, the vehicle 10 can include one or more pressure sensors 90 and/or one or more position sensors 92. Generally, the pressure sensors 90 and the position sensors 92 are in electrical communication with the controller 86. The pressure sensors 90 can monitor the pressure in the chamber 64, and specifically, one of the pressure sensors 90 can monitor the pressure in the first chamber portion 68 and another one of the pressure sensors 90 can monitor the pressure in the second chamber portion 70. The position sensors 92 can monitor the actuator device 56 which correspondingly indicates the position of the first and second suspension corner assemblies 38, 44, and specifically, the position sensors 92 can monitor the position of the piston 66 inside the chamber 64. The pump 84, the valves 88, the pressure sensors 90 and the position sensors 92 cooperate to position the piston 66 of the actuator device 56 and the bladders 78 as desired which correspondingly positions the structure 14 at the desired distance from the road 16, the desired amount of preload and the desired amount of stiffness of the suspension system 12. The actuator device 56 is configured to use low flow rate hydraulic pressure, and thus the actuator device 56 does not require a high flow rate hydraulic active control.

As suggested above, the controller 86 can be in electrical communication with the actuator device 56. The controller 86 can control the actuator device 56 to move the piston 66 to a desired position to position the structure 14 in the desired distance from the road 16 and/or to provide the desired stiffness of the suspension system 12. The controller 86 can be part of an electronic control module, e.g., an engine control module. The controller 86 includes a processor 94 and a memory 96 on which is recorded instructions for controlling the actuator device 56, the pump 84, the sensors 90, 92, the valves 88, etc. The controller 86 can control other components of the vehicle 10 not specifically discussed herein and/or be in electrical communication with another controller of the vehicle 10. The controller 86 is configured to execute the instructions from the memory 96, via the processor 94. For example, the controller 86 can be a host machine or distributed system, e.g., a computer such as a digital computer or microcomputer, acting as a vehicle 10 control module, and/or as a proportional-integral-derivative (PID) controller device having a processor, and, as the memory 96, tangible, non-transitory computer-readable memory such as read-only memory (ROM) or flash memory. The controller 86 can also have random access memory (RAM), electrically erasable programmable read only memory (EEPROM), a high-speed clock, analog-to-digital (A/D) and/or digital-to-analog (D/A) circuitry, and any required input/output circuitry and associated devices, as well as any required signal conditioning and/or signal buffering circuitry. Therefore, the controller 86 can include all software, hardware, memory 96, algorithms, connections, sensors, etc., necessary to control the actuator device 56, the pump 84, the sensors 90, 92, the valves 88, etc. As such, a control method operative to control the actuator device 56, the pump 84, the sensors 90, 92, the valves 88, etc. can be embodied as software or firmware associated with the controller 86. It is to be appreciated that the controller 86 can also include any device capable of analyzing data from various sensors, comparing data, making the necessary decisions required to control and monitor the actuator device 56, the pump 84, the sensors 90, 92, the valves 88, etc. It is to also be appreciated that more than one controller 86 can be utilized to control the components discussed above.

The actuator device 56 can be actuated automatically or manually to adjust the height of the structure 14 relative to the road 16 and/or the preload and/or to adjust the stiffness of the suspension system 12. For example, one or more buttons can be disposed inside a passenger compartment of the vehicle 10 which can be manually actuated. The button(s) can be pushed, rotated, etc. As another example, as the vehicle 10 changes speed, the controller 86 can be in electrical communication with a speed sensor to automatically adjust the height of the structure 14 relative to the road 16 and/or to adjust the stiffness of the suspension system 12 in relation to the speed that the vehicle 10 is travelling. The controller 86 can be utilized to automatically control the actuator device 56.

Turning back to the first and second suspension corner assemblies 38, 44, referring to FIGS. 1-3, the first suspension corner assembly 38 can also include a first push rod 98 attached to the first bell crank 40. Similarly, as shown in FIGS. 1, 2 and 4, the second suspension corner assembly 44 can also include a second push rod 100 attached to the second bell crank 46. The first push rod 98 is also coupled to the first wheel assembly 26 and the second push rod 100 is also coupled to the second wheel assembly 28. When changing the preload of the suspension system 12 to change the height of the structure 14 relative to the road 16, the amount of force 60 applied to the first and second push rods 98, 100 is changed.

The first and second bell cranks 40, 46 are rotatable concurrently about the first and second axes 42, 48 respectively in response to actuation of the actuator device 56 changing the preload which correspondingly changes the amount of force 60 applied to the first and second push rods 98, 100 which repositions the structure 14 along the vertical axis 58. For example, increasing the preload which increases the amount of force 60 applied to the first and second push rods 98, 100 cause the structure 14 to move upwardly along the vertical axis 58. Comparing FIGS. 1 and 2, movement of the piston 66 causes the first and second bell cranks 40, 46 to rotate about the respective first and second axes 42, 48, and rotation of the first and second bell cranks 40, 46 causes the amount of force 60 applied to the first and second push rods 98, 100 to change, which repositions the structure 14. It is to be appreciated that the first and second corner assemblies 38, 44 can also include one or more control arms 102 (see FIGS. 1 and 2) coupled to the first and second wheel assemblies 26, 28, etc. The first push rod 98 can be attached to the lower control arm 102, i.e., the control arm 102 closer to the road 16 than the other control arm 102. Similarly, the second push rod 100 can be attached to the lower control arm 102, i.e., the control arm 102 closer to the road 16 than the other control arm 102. The control arms 102 will not be discussed further.

Turning back to the actuator device 56 and FIGS. 1 and 2, the cylinder 62 can include a first end 104 and a second end 106 spaced from each other along the longitudinal axis 72. Generally, the cylinder 62 extends at least partially across the vehicle 10. Therefore, for example, the cylinder 62 is disposed between the driver's side 30 and the passenger's side 32 of the vehicle 10. It is to be appreciated that the cylinder 62 can be any suitable configuration.

Continuing with FIGS. 1 and 2, the actuator device 56 can include a first rod 108 attached to the piston 66 and extending to a distal end 110. Generally, the distal end 110 is disposed outside of the first end 104 of the cylinder 62. Additionally, the distal end 110 is attached to the first bell crank 40. Therefore, when the piston 66 moves along the longitudinal axis 72, the first rod 108 and the piston 66 move in unison which correspondingly moves the first bell crank 40. Said differently, the piston 66 is movable inside the chamber 64 in response to rotation of the first and second bell cranks 40, 46 about the first and second axes 42, 48 respectively which correspondingly move the first rod 108. Movement of the piston 66 causes more or less of the first rod 108 to be disposed in the chamber 64 of the cylinder 62 (compare FIGS. 1 and 2). For example, to move the structure 14 toward the road 16 along the vertical axis 58, additional liquid fluid is injected into the first chamber portion 68 while some liquid fluid is expelled out of the second chamber portion 70 which causes the piston 66 to move toward the second end 106 of the chamber 64, and thus the first and second bell cranks 40, 46 correspondingly rotate. As another example, to move the structure 14 away from the road 16 along the vertical axis 58, additional liquid fluid is injected into the second chamber portion 70 while some liquid fluid is expelled out of the first chamber portion 68 which causes the piston 66 to move toward the first end 104 the chamber 64, and thus the first and second bell cranks 40, 46 correspondingly rotate.

Again, continuing with FIGS. 1 and 2, the actuator device 56 can also include a second rod 112 attached to the second end 106 of the cylinder 62. Additionally, the second rod 112 is attached to the second bell crank 46. Therefore, the second rod 112 extends to distal ends 114, with one distal end 114 of the second rod 112 attached to the cylinder 62 and another distal end 114 of the second rod 112 attached to the second bell crank 46. Generally, the second rod 112 is disposed between the second end 106 of the cylinder 62 and the second bell crank 46. Furthermore, the second rod 112 is disposed outside of the chamber 64 of the cylinder 62. When the piston 66 moves along the longitudinal axis 72, the cylinder 62 and the second rod 112 move in unison which correspondingly moves the second bell crank 46 (compare FIGS. 1 and 2).

Again, comparing FIGS. 1 and 2, the first and second bell cranks 40, 46 rotate concurrently about the first and second axes 42, 48 respectively in opposite directions. For example, when the first bell crank 40 rotates clockwise, the second bell crank 46 rotates counter-clockwise. Furthermore, when the piston 66 moves away from the second rod 112, the first rod 108 of the piston 66 moves further out of the cylinder 62, and thus, the cylinder 62 and the piston 66 occupy more space between the first and second wheel assemblies 26, 28. Alternatively, when the piston 66 moves toward the second rod 112, the first rod 108 of the piston 66 moves further into the cylinder 62, and thus, the cylinder 62 and the piston 66 occupy less space between the first and second wheel assemblies 26, 28.

Referring to FIG. 3, the first bell crank 40 can include a first attachment point 116 on the first axis 42. Specifically, the first attachment point 116 is a point on the first axis 42. The first bell crank 40 is rotatably attached to the first support 20 at the first attachment point 116. Therefore, the first bell crank 40 is rotatable about the first axis 42 at the first attachment point 116.

Continuing with FIG. 3, the first bell crank 40 can include a second attachment point 118 spaced from the first attachment point 116. The actuator device 56 is attached to the first bell crank 40 at the second attachment point 118. Specifically, the distal end 110 of the first rod 108 is attached to the second attachment point 118. Therefore, linear movement of the first rod 108 of the piston 66 causes rotational movement of the first bell crank 40. Specifically, the piston 66 and the first rod 108 move axially along the longitudinal axis 72 which causes the first bell crank 40 to rotate about the first axis 42 at the first attachment point 116. The second attachment point 118 is disposed a first radial distance 120 from the first axis 42.

Additionally, as shown in FIG. 3, the first bell crank 40 can include a third attachment point 122 spaced from the first and second attachment points 116, 118. The first coil-over shock 50 is attached to the first bell crank 40 at the third attachment point 122. Therefore, the first coil-over shock 50 is attached to the third support 24 and the first bell crank 40 at the third attachment point 122. For example, when the first bell crank 40 rotates clockwise about the first axis 42, the first coil-over shock 50 can expand or lengthen. For orientation purposes regarding the clockwise verses counter-clockwise example, the rotation of the first bell crank 40 is taken facing the front 34 of the vehicle 10 (the front 34 of the vehicle 10 is shown in FIGS. 1 and 2). The third attachment point 122 is disposed a second radial distance 124 from the first axis 42, with the first radial distance 120 being greater than the second radial distance 124.

Continuing with FIG. 3, the first bell crank 40 can further include a fourth attachment point 126 spaced from the first, second and third attachment points 116, 118, 122. The first push rod 98 is attached to the first bell crank 40 at the fourth attachment point 126. The fourth attachment point 126 is disposed a third radial distance 128 from the first axis 42, with the third radial distance 128 being greater than the second radial distance 124. For example, when the first bell crank 40 rotates clockwise about the first axis 42, the amount of force 60 applied to the first push rod 98 increases which increases the force 60 applied to the first wheel assembly 26, and thus, lifts the structure 14. It is to be appreciated that the first, second, third and fourth attachment points 116, 118, 122, 126 can be in other locations than discussed above, and the locations discussed above are one suitable example.

Turning to FIG. 4, the second bell crank 46 can include a first connection point 130 on the second axis 48. Specifically, the first connection point 130 is a point on the second axis 48. The second bell crank 46 is rotatably attached to the second support 22 at the first connection point 130. Therefore, the second bell crank 46 is rotatable about the second axis 48 at the first connection point 130.

Continuing with FIG. 4, the second bell crank 46 can include a second connection point 132 spaced from the first connection point 130. The actuator device 56 is attached to the second bell crank 46 at the second connection point 132. Specifically, the second rod 112 is attached to the second connection point 132. More specifically, one distal end 114 of the second rod 112 is attached to the second connection point 132. Therefore, linear movement of the second rod 112 of the cylinder 62 causes rotational movement of the second bell crank 46. Specifically, the cylinder 62 and the second rod 112 move axially along the longitudinal axis 72 which causes the second bell crank 46 to rotate about the second axis 48 at the first connection point 130. The second connection point 132 is disposed a first radial distance 134 from the second axis 48.

Additionally, as shown in FIG. 4, the second bell crank 46 can include a third connection point 136 spaced from the first and second connection points 130, 132. The second coil-over shock 52 is attached to the second bell crank 46 at the third connection point 136. Therefore, the second coil-over shock 52 is attached to the third support 24 and the second bell crank 46 at the third connection point 136. For example, when the second bell crank 46 rotates counter-clockwise, the second coil-over shock 52 can expand or lengthen. For orientation purposes regarding the clockwise verses counter-clockwise example, the rotation of the second bell crank 46 is taken facing the front 34 of the vehicle 10 (the front 34 of the vehicle 10 is shown in FIGS. 1 and 2). The third connection point 136 is disposed a second radial distance 138 from the second axis 48, with the first radial distance 134 of the second connection point 132 being greater than the second radial distance 138 of the third connection point 136.

Continuing with FIG. 4, the second bell crank 46 can further include a fourth connection point 140 spaced from the first, second and third connection points 130, 132, 136. The second push rod 100 is attached to the second bell crank 46 at the fourth connection point 140. The fourth connection point 140 is disposed a third radial distance 142 from the second axis 48, with the third radial distance 142 of the fourth connection point 140 being greater than the second radial distance 138 of the third connection point 136. For example, when the second bell crank 46 rotates counter-clockwise about the second axis 48, the amount of force 60 applied to the second push rod 100 increases which increases the force 60 applied to the second wheel assembly 28, and thus, lifts the structure 14. It is to be appreciated that the first, second, third and fourth connection points 130, 132, 136, 140 can be in other locations than discussed above, and the locations discussed above are one suitable example.

The actuator device 56 provides a way to offset the downward load 18 applied to the vehicle 10. The actuator device 56 can be adjusted to change the first spring rate of the suspension system 12 to set the desired stiffness of the suspension system 12. Furthermore, the actuator device 56 can be adjusted to change the preload of the suspension system 12 to set the desired downward load 18 that the suspension system 12 can offset.

Additionally, the actuator device 56 can be adjusted to change the preload of the suspension system 12 to provide a way to move the structure 14 relative to the road 16. The actuator device 56 provides heave control of the vehicle 10, i.e., vertical displacement (up/down along the vertical axis 58). For example, roll does not influence the actuator device 56. The structure 14 or sprung mass can be repositioned to provide clearance over bumps, ramps, holes, etc. Additionally, the structure 14 can be repositioned along the vertical axis 58 closer to the road 16 to increase the generation of the downward load 18 on the vehicle 10. For example, when the actuator device 56 is for the suspension system 12 of the front of the vehicle 10, repositioning the structure 14 changes the height of the front of the vehicle 10. Changing the height of the vehicle 10, changes the aerodynamics of the vehicle 10.

Furthermore, the actuator device 56 can be adjusted to change the stiffness of the suspension system 12. Therefore, the suspension system 12 can be adjusted to provide a softer suspension or a stiffer suspension as desired.

In addition, the actuator device 56 can be attached to the vehicle 10 as a unit. The actuator device unit can be added to a vehicle or the actuator device unit can be replaced with another unit. In other words, the actuator device 56 can be a stand-alone unit. As such, the actuator device 56 can be installed on the vehicle 10 as a unit or removed from the vehicle 10 as a unit.

The actuator device 56 extends across the vehicle 10 to couple together the first and second suspension corner assemblies 38, 44. Therefore, having the actuator device 56 coupled to both the first and second corner assemblies 38, 44, the travel of the actuator device 56 is doubled when both tires 36 are moving in the same direction. It is to be appreciated that the first spring rate of the suspension system 12 can be referred to as heave stiffness counteracting the downward load 18 of the structure 14 when the tire 36 of both the first and second wheel assemblies 26, 28 are moving in phase.

While the best modes for carrying out the disclosure have been described in detail, those familiar with the art to which this disclosure relates will recognize various alternative designs and embodiments for practicing the disclosure within the scope of the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

The invention claimed is:

1. A vehicle comprising:
a structure;
a suspension system supporting the structure, with the suspension system including:
  a first suspension corner assembly coupled to the structure and including a first bell crank rotatably attached to the structure, and wherein the first suspension corner assembly includes a first coil-over shock attached to the first bell crank;
  a second suspension corner assembly coupled to the structure and including a second bell crank rotatably attached to the structure, and wherein the second suspension corner assembly includes a second coil-over shock attached to the second bell crank; and
  an actuator device attached to the first and second bell cranks, with the actuator device operable to selectively change at least one of a first spring rate of the suspension system and a preload of the suspension system to counteract a downward load applied to the structure;
wherein the actuator device includes a cylinder defining a chamber and a piston disposed inside the chamber to split the chamber into a first chamber portion and a second chamber portion, wherein the piston is selectively movable inside the chamber along a longitudinal axis to correspondingly change sizes of the first and second chamber portions which selectively changes the preload;
wherein the cylinder includes a first end and a second end spaced from each other along the longitudinal axis, wherein the actuator device includes a first rod attached to the piston and extending to a distal end, with the distal end disposed outside of the first end of the cylinder and the distal end attached to the first bell crank;
wherein the first and second coil-over shocks have a second spring rate, with the actuator device operable in a parallel relationship to the first and second coil-over shocks such that the second spring rate remains substantially the same when the first spring rate changes.

2. A vehicle as set forth in claim 1 wherein the actuator device includes a second rod attached to the second end of the cylinder and the second bell crank; wherein the first bell crank is selectively rotatable about a first axis and the second bell crank is selectively rotatable about a second axis, with the piston movable inside the chamber in response to rotation of the first and second bell cranks about the first and second axes respectively which correspondingly moves the first rod.

3. A vehicle as set forth in claim 1 wherein the actuator device includes a first accumulator in fluid communication with the first chamber portion and a second accumulator in fluid communication with the second chamber portion; and wherein pressure is selectively changed in the first and second accumulators while the piston remains substantially stationary inside the chamber to selectively change the first spring rate.

4. A vehicle as set forth in claim 1 wherein the structure includes a first support and a second support spaced from each other, with the first bell crank rotatably attached to the first support and the second bell crank rotatably attached to the second support.

5. A vehicle as set forth in claim 4 wherein the structure includes a third support disposed between the first and second supports, and wherein the first coil-over shock is attached to the first bell crank and the third support, and the second coil-over shock is attached to the second bell crank and the third support.

6. A vehicle as set forth in claim 4 wherein the first bell crank is rotatably positioned about a first axis and includes a first attachment point on the first axis, with the first bell crank rotatably attached to the first support at the first attachment point.

7. A vehicle as set forth in claim 6 wherein the first bell crank includes a second attachment point spaced from the first attachment point, with the actuator device attached to the first bell crank at the second attachment point.

8. A vehicle as set forth in claim 7 wherein the first bell crank includes a third attachment point spaced from the first and second attachment points, and wherein the first suspension corner assembly includes a first coil-over shock, with the first coil-over shock attached to the first bell crank at the third attachment point.

9. A vehicle as set forth in claim 8 wherein the first bell crank includes a fourth attachment point spaced from the first, second and third attachment points, and wherein the first suspension corner assembly includes a first push rod attached to the first bell crank at the fourth attachment point.

10. A vehicle as set forth in claim 4 wherein the second bell crank is rotatable positioned about a second axis and includes a first connection point on the second axis, with the second bell crank rotatably attached to the second support at the first connection point.

11. A vehicle as set forth in claim 10 wherein the second bell crank includes a second connection point spaced from the first connection point, with the actuator device attached to the second bell crank at the second connection point.

12. A vehicle as set forth in claim 11 wherein the second bell crank includes a third connection point spaced from the first and second connection points, and wherein the second suspension corner assembly includes a second coil-over shock, with the second coil-over shock attached to the second bell crank at the third connection point.

13. A vehicle as set forth in claim 12 wherein the second bell crank includes a fourth connection point spaced from the first, second and third connection points, and wherein the second suspension corner assembly includes a second push rod attached to the second bell crank at the fourth connection point.

14. A vehicle as set forth in claim 1 wherein the first suspension corner assembly includes a first push rod attached to the first bell crank and the second suspension corner assembly includes a second push rod attached to the second bell crank, with the first and second bell cranks rotatable concurrently about a first axis and a second axis respectively in response to actuation of the actuator device changing the preload which correspondingly changes an amount of force applied to the first and second push rods which repositions the structure along a vertical axis.

15. A suspension system for a vehicle, with the vehicle including a structure, the system comprising:
   a first suspension corner assembly adapted to support the structure and including a first bell crank;
   a second suspension corner assembly adapted to support the structure and including a second bell crank; and
   an actuator device attached to the first and second bell cranks, with the actuator device operable to selectively change at least one of a first spring rate and a preload of the suspension system;
   wherein the actuator device includes a cylinder defining a chamber and a piston disposed inside the chamber to split the chamber into a first chamber portion and a second chamber portion, and wherein the actuator device includes a first accumulator in fluid communication with the first chamber portion and a second accumulator in fluid communication with the second chamber portion;
   wherein the actuator device includes a first rod attached to the piston and extending to a distal end, with the distal end attached to the first bell crank;
   wherein the actuator device includes a second rod attached to the cylinder and the second bell crank.

16. A system as set forth in claim 15 wherein the piston is selectively movable inside the chamber along a longitudinal axis to correspondingly change sizes of the first and second chamber portions which selectively changes the preload.

17. A system as set forth in claim 16 wherein pressure is selectively changed in the first and second accumulators while the piston remains substantially stationary inside the chamber to selectively change the first spring rate.

18. A system as set forth in claim 16 wherein the cylinder includes a first end and a second end spaced from each other along the longitudinal axis, with the distal end disposed outside of the first end of the cylinder; wherein the second rod is attached to the second end of the cylinder and the second bell crank; wherein the first bell crank is selectively rotatable about a first axis and the second bell crank is selectively rotatable about a second axis, with the piston movable inside the chamber in response to rotation of the first and second bell cranks about the first and second axes respectively which correspondingly moves the first rod.

19. A system as set forth in claim 15 wherein the first suspension corner assembly includes a first coil-over shock attached to the first bell crank, and wherein the second suspension corner assembly includes a second coil-over shock attached to the second bell crank, and wherein the actuator device is operable in a parallel relationship to the first and second coil-over shocks.

20. A suspension system for a vehicle, with the vehicle including a structure, the system comprising:
   a first suspension corner assembly adapted to support the structure and including a first bell crank;
   a second suspension corner assembly adapted to support the structure and including a second bell crank;

an actuator device attached to the first and second bell cranks, with the actuator device operable to selectively change at least one of a first spring rate and a preload of the suspension system;

wherein the first suspension corner assembly includes a first coil-over shock directly attached to the first bell crank and attached to the structure, and the second suspension corner assembly includes a second coil-over shock directly attached to the second bell crank and attached to the structure; and wherein the actuator device includes a cylinder defining a chamber and a piston disposed inside the chamber and wherein the cylinder is disposed above the first and second coil-over shocks.

\* \* \* \* \*